July 4, 1950
G. J. PERLOW ET AL
2,513,356
RADIOACTIVITY DETECTOR
Filed March 31, 1949
2 Sheets-Sheet 1
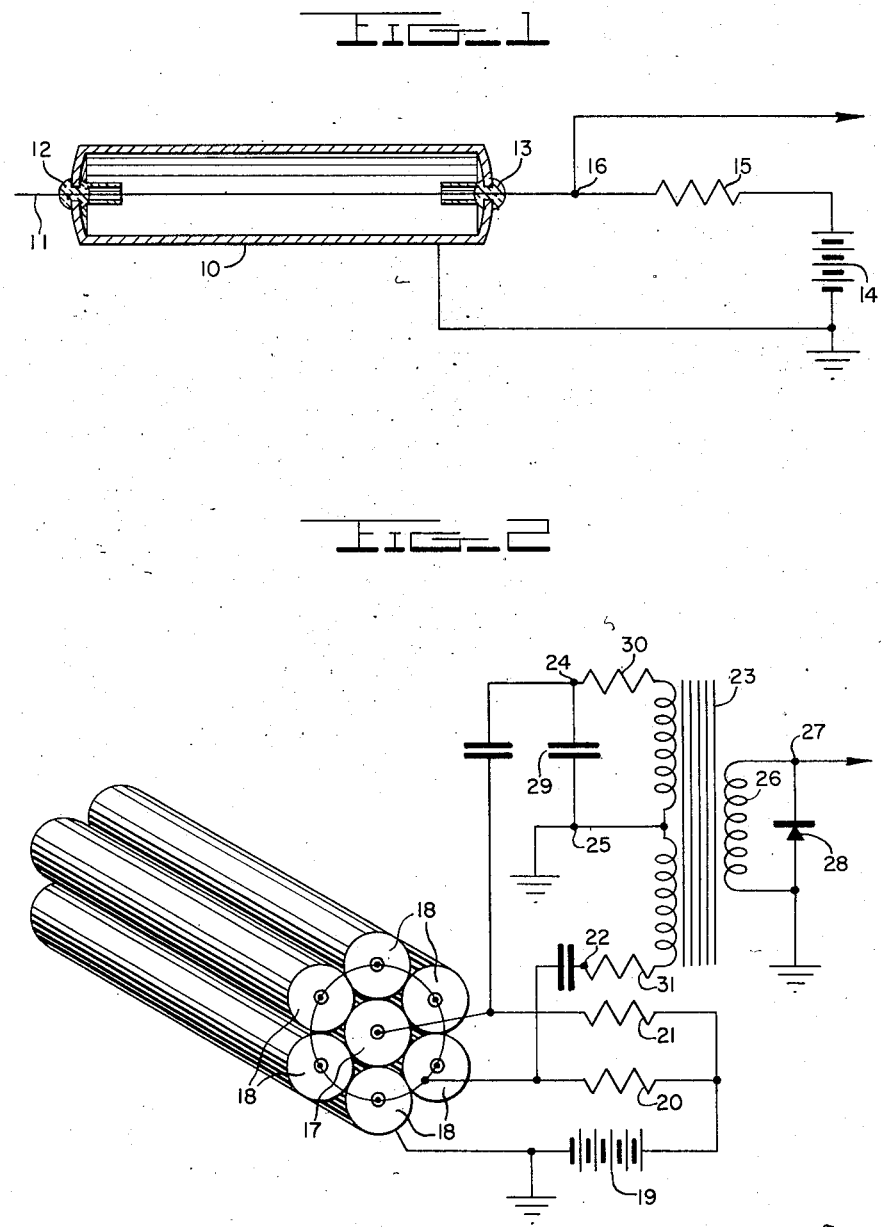
Inventors
GILBERT J. PERLOW
JOHN D. SHIPMAN, JR.
CLARENCE A. SCHROEDER
By W. J. Houfeld
ATTORNEY July 4, 1950 G. J. PERLOW ET AL 2,513,356
RADIOACTIVITY DETECTOR
Filed March 31, 1949 2 Sheets-Sheet 2
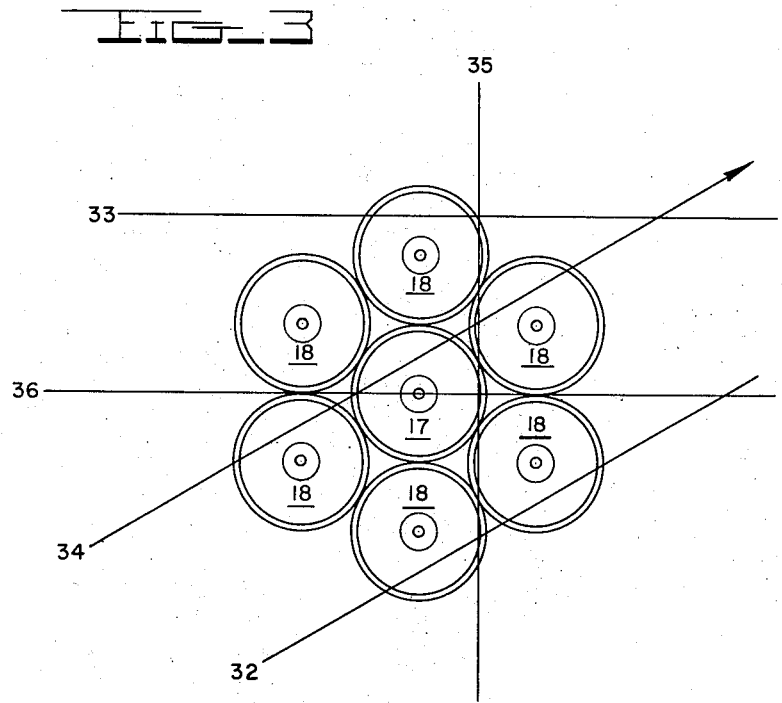
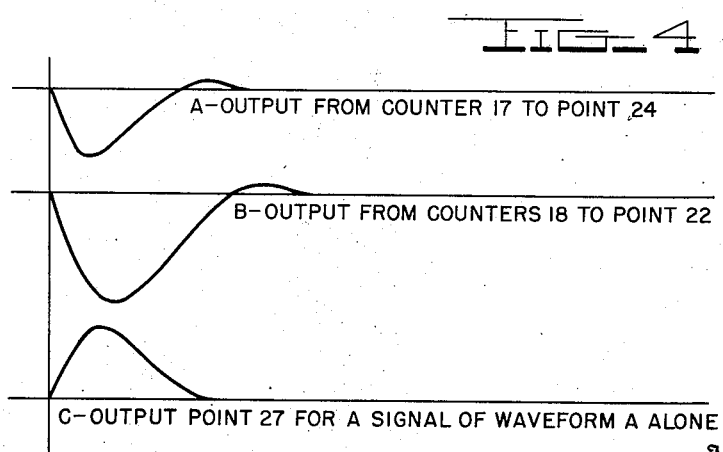
INVENTORS
GILBERT J. PERLOW
JOHN D. SHIPMAN JR.
CLARENCE A. SCHROEDER
ATTORNEY Patented July 4, 1950

2,513,356

UNITED STATES PATENT OFFICE 2,513,356

RADIOACTIVITY DETECTOR

Gilbert J. Perlow, John D. Shipman, Jr., and Clarence A. Schroeder, Washington, D. C.

Application March 31, 1949, Serial No. 84,664

8 Claims. (Cl. 250—83.6)

(Granted under the act of March 3, 1883, as amended April 30, 1928; 370 O. G. 757)

This invention relates to radioactivity detectors and in particular to a detector designed to operate with a reduced output from cosmic rays.

In various types of radioactivity detectors, particularly those intended to respond to gamma rays, the minimum response level is limited by the "background" output therefrom due to cosmic rays. This is of necessity because it is virtually impossible to find a place on the earth's surface or in its atmosphere where these cosmic rays or their effects are not present. Ionizing type counters which produce an output signal as a result of the passage of gamma rays therethrough are also ionized to produce an output signal upon the passage of charged particles from cosmic radiation. In regions where the gamma ray concentration is low, they may be completely masked by the charged particles.

It is therefore an object of the present invention to provide a radioactivity detector having a low response to charged particles from cosmic radiation.

Another object of the present invention is to provide a radioactivity detector which will respond measurably to gamma rays in the presence of a large cosmic ray background such as is found at high elevation.

Other and further object and features of the present invention will become apparent upon a careful consideration of the accompanying specification and drawings illustrating a typical application of the principles of the present invention.

Fig. 1 of the drawing shows in cross section a typical ionization type counter tube of the self-quenching type available in the prior art which will produce an output signal upon passage therethrough of ionizing radiation and gamma rays.

Fig. 2 shows a counter apparatus and resolving equipment constructed in accordance with the teachings of the present invention providing reduced output to ionizing radiation.

Fig. 3 is an end view of a bundle of counter tubes embodying in part the present invention showing several possible paths of ionizing radiation and gamma rays therethrough.

Fig. 4 is a series of waveforms showing various signals from the device of Fig. 2 and the results of combinations to produce output signals as a result of the passage of gamma rays and to minimize output signals due to ionizing radiation.

In accordance with the general teachings of the present invention a radiation counter is made available which has a higher ratio of gamma ray response to cosmic ray response than simple counters heretofore available. This higher response ratio is achieved by enclosing a primary counter with secondary counting apparatus in such a manner that cosmic rays affecting the primary counter also affect the secondary counting apparatus. In this combination however, both primary and secondary counter devices provide practically normal response to gamma rays independent of the other. The signals from the primary and secondary counter devices are combined in such polarity and with signal shaping and clipping to produce output signals only when gamma rays affect the primary counter and eliminate signals produced by the passage of gamma rays and cosmic rays through the secondary counter as well as signals produced by the passage of cosmic rays through both primary and secondary counter devices.

With particular reference to Fig. 1 of the drawing a simple radiation counter is shown comprising primarily an ionization tube 10 having an outer shell which may be of copper approximately $\frac{1}{32}$ of an inch thick. Tube 10 is shown in longitudinal cross-section but is of a cylindrical nature and may be approximately 1 inch in diameter and eight inches long. The tube is sealed at the ends and a thin wire conductor 11 is placed at the center thereof, connections thereto being made through glass seals 12, 13. The entire tube may be highly evacuated possessing however, a residual quantity of gas and an organic vapor. A typical gas might be argon while a typical organic vapor might be ethyl alcohol. A high potential, typically 1,000 v. is placed between the conductor 11 and the shell 10 by a source 14 through a resistance 15. Glass seals 12, 13 have portions thereof extending into the tube 10 covering a portion of conductor 11 at each end of tube 10.

The counter tube of Fig. 1 is normally nonconductive, however several types of radiation can ionize the residual gas in the tube to produce a discharge or current flow near the conductor 11. This current flow produces a drop in potential across resistance 15 which is supplied to an external metering or counter circuit from point 16. The discharge continues for only a short period of time being eventually snuffed-out due to the presence of the organic ethyl alcohol vapor. The result is a pulse type output signal produced in response to the passage through the tube of such radiation particles.

Gamma rays themselves are uncharged and cannot directly affect the tube, however they can produce effects within tube 10 in three principal ways, which can cause ionization of the tube 10.

The first process is known as Pair Production, in which both positive and negative electrons are produced by "materialization" out of empty space. For this process to occur, material must be in the immediate vicinity to act somewhat as a catalytic agent. Therefore this process usually takes place within the wall of the tube. Another primary requirement for this process is that the gamma ray quantum energy be in excess of approximately 1,000,000 electron volts and in the production of such negative and positive electrons the gamma ray disappears completely.

The second process which produces particles which can ionize the gas in the tube is known as "Compton scattering." In this process a gamma ray of a lower energy level knocks out one electron from an atom of the tube wall or the gas within, and then continues on with reduced quantum energy.

In third process, still lower low energy gamma rays produce photoelectrons in a manner similar to that by which they are produced in a photoelectric tube. The gamma ray strikes an atom, knocks out the photoelectron and then disappears. This photoelectron can ionize the counter tube.

On a statistical basis about 1% of the gamma rays passing through the tube will cause ionization and consequent production of an output signal. It is this 1% that the radiation counter indicates and for which it produces an output signal.

A second type of radiation to which this type of counter will respond is to ionizing radiation such as mesons and electrons found in the cosmic radiation. Such radiation is of high energy content and upon passage through the tube of Fig. 1 produces low speed electrons and positive ions simultaneously by disrupting atoms of the gas in the tube. The statistical efficiency with which cosmic rays produce ionization within tube 10 to produce an output signal approaches 100%.

Cosmic radiation particles themselves are of very high energy and can penetrate conventional shielding quite readily. A shielding wall of lead several inches thick is quite easily penetrated. Furthermore the gamma radiation itself is absorbed by such lead shielding. Therefore it is not practical to attempt massive shielding in any counter. It has been necessary therefore to limit gamma ray detecting operations to such gamma ray concentrations that the spurious responses due to cosmic rays are of small consequence.

The apparatus as shown in Fig. 2 has been found to reduce the background counting rate due to cosmic rays materially. In this device a bundle of tubes each similar to the single tube of Fig. 1 is employed. This bundle comprises a central tube 17 about which is placed a plurality of other tubes 18 in such a manner as to enclose, as well as practical, the inner tube. For convenience, the tubes 17 and 18 were chosen of the same diameter and the minimum number of tubes 18 providing nearly complete enclosure of tube 17 was therefore 6. All tubes 18 are connected in parallel and across potential source 19 through resistance 20. As for a single tube, a potential of 1,000 v. may be satisfactory. Tube 17 is independently connected to potential source 19 through resistance 21. Signals produced across resistance 20 are applied through terminal 22 across one section of a primary of pulse transformer 23. Signals produced across resistance 21 by tube 17 are applied through terminal 24 to a second section of the split primary of the pulse transformer 23. The center tap 25 of the transformer 23 primary is preferably grounded as shown. The two halves of the primary winding of transformer 23 are wound in the same direction so that a negative pulse signal applied to terminal 22 will produce a flux change in opposition to the flux change produced by a negative pulse signal supplied to terminal 24.

The polarity of secondary winding 26 of transformer 23 is such that a negative pulse signal developed across resistance 21 by tube 17 and supplied to terminal 24 will produce a positive pulse output at terminal 27. Negative pulses applied to terminal 22 will then tend to produce output pulses of negative polarity at terminal 27, however, a rectifier element 28 is placed in shunt with winding 26 and connected to absorb this negative signal. Damping resistors 30, 31 are connected to the primary terminals of transformer 23 to minimize oscillatory action.

With the fundamental circuit of the invention thus described reference is now had to Fig. 3 showing a typical cross section in a plane which might be normal to the longitudinal axes of the tubes and near the center thereof. This Fig. 3 is intended primarily to show a few of the many possible paths a particle of radiation energy might take in crossing the counter bundle. Cosmic radiation following paths 32 and 33 will produce a discharge by at least one of the counters 18 to produce a signal which will be applied to terminal 22, however because of the clipping action of the element 28 this will not produce an output signal at terminal 27. Paths 34, 35 are for particles that will cause ionization of two or more of the tubes 18 and tube 17 as well. Still an output signal is not produced at point 27, however, because the combining effect of transformer 23 will produce cancellation of the signal from tube 17.

The cosmic ray following the path 36 as well as a ray traveling directly through tube 17 substantially parallel to the longitudinal axis thereof are rare occurrences but they will cause ionization of tube 17 without the production of an opposing ionization of at least one of the tubes 18. Hence an unwanted output signal will result at point 27. Cosmic ray response such as this contributes to the minimum background level for the apparatus of the invention.

Gamma radiation on the other hand will behave quite differently in passage through the tube bundle. As previously explained, gamma radiation can produce ionization of a counter tube in several ways and in any way is at a low statistical figure (1%). Thus of 1,000 gamma rays following a typical path 34 traveling in the direction indicated, approximately 10 will be lost in the incident tube 18. The remainder (approximately) 990 will continue through, and of this the statistical figure (also about 1%) or about 9.9 will cause ionization of tube 17 to produce an output signal at terminal 27. The statistical 1% that produces ionization of the incident tube 18 will of course not occur in time coincidence with all of the statistical 1% that ionize tube 17 so that cancellation of the output from tube 17 will not result. It follows therefore, that for gamma radiation, tube 17 will operate essentially as though tubes 18 were not present.

To the circuit of Fig. 2 above described, certain elements have been added for reasons which will now be seen. Tube 17 alone is connected across a portion of the split primary of transformer 23. Across the other portion of the primary of this transformer, all of the tubes 18 with their inherent distributed capacitances are connected. The result is that even with the usual two tubes 18 that fire for each cosmic ray and the attendant large voltage drop, the potential at terminal 24 may initially fall faster than the compensating potential at terminal 22 will fall, producing thereby a false output signal. To prevent such action, capacitance 29 has been placed in shunt with tube 17 to purposely decrease the rate of change of potential at terminal 24. The tendency to production of false signals may be further minimized by making tube 17 somewhat shorter than tube 18 so that the peak conduction current is less.

The methods of combination of the various signals produced by the apparatus of Fig. 2 are illustrated more completely by the waveforms of Fig. 4. Waveform A shows a typical counter tube output signal such as would be produced by counter 17 or any of counters 18. The negative overshoot is produced by oscillatory action of the inductance-capacitance present. Where this output signal is produced by counter tube 17, the winding polarity is such that the initial portion appears as a positive pulse output at terminal 27 while the overshoot portion is eliminated by rectifier element 28. Where this output signal is produced by one of tubes 18 it is of the opposite polarity and the initial portion is immediately removed by rectifier element 28. With this initial energy thus removed there is nothing left to produce an overshoot in the positive direction. The simultaneous occurrence of two signals of the type shown by waveform A, one at terminal 24, the other at terminal 22, will produce substantial cancellation so that all or at least the major portion of the output signal from tube 17 will be eliminated.

The methods of combination of the various signals produced by the apparatus of Fig. 2 are shown more completely by the waveform of Fig. 4. Waveform A shows a typical counter tube output signal such as would be produced by counter 17. Waveform B shows a typical output signal such as would be produced by the counter tubes 18. This signal is of normally greater amplitude than the signal of waveform A because generally, speaking, two of tubes 18 will be fired by the passage of cosmic radiation particles. The signal of waveform C represents the output at point 27 produced upon conduction of tube 17 responsive to a gamma ray at such time as there is no signal produced by tubes 18.

The apparatus thus described has such improved operational characteristics and such reduced background due to cosmic radiation that new fields of exploration are opened. As a radioactivity detector the minimum background is established by the gamma rays to which the instrument is responsive which are produced by the cosmic radiation.

As a practical instrument a typical apparatus embodying the features of the invention would respond to gamma rays whose quantum energy lies in a certain range. A lower limit of the range is present because of the absorption of low energy gamma rays in the material of the outer counters. An upper limit is also in existence because gamma rays that have high energy may in turn produce electrons of such high energy that even though they are produced in tube 17 and cause the ionization of that tube, they will continue through to one of the tubes 18 to cause ionization thereof with cancellation of the output signal. The operating range in a typical case could be approximately 0.08 to 5.0 M. E. V. and could be set by choice of the material making up the wall of tubes 17, 18 and its thickness. To obtain this range typical tubes having a wall thickness of $1/32''$ and made of copper would include the greater part of the energy range of gamma rays from radioactive sources.

From the foregoing discussion it is apparent that considerable modification of the features of the present invention is possible and while the device herein described and the forms of apparatus for the operation thereof constitutes a preferred embodiment of the features of the present invention it is to be understood that the invention is not limited to this precise device and form of apparatus and that changes may be made therein without departing from the scope of the invention which is defined in the appended claims.

The invention decribed herein may be manufactured and used by or for the Government of the United States of America for governmental purposes without the payment of any royalties thereon or therefor.

What is claimed is:

1. A gamma radiation detector, comprising a first radio active counter means, a second radio active counter means surrounding the first providing no substantial opposition to the passage of gamma ray energy to the first counter means, and output means connected to the first and second counter means combining in opposition the output signals from said first and second counter means.

2. A gamma ray radiation detector having low response to cosmic radiation, comprising a first radiation sensitive means providing no substantial opposition to the passage of gamma ray energy therethrough responsive to produce signals in the presence of cosmic radiation products and gamma radiation, secondary radiation sensitive means of the same character as the first means disposed about said first radiation sensitive means to receive substantially all radiation products traveling through the first radiation sensitive means providing no substantial absorption of gamma ray energy, and differential combining means connected to the first and secondary radiation sensitive means operative to deliver an output signal of selected polarity when the first radiation sensitive means produces a signal which is non synchronous with a signal produced by a secondary radiation sensitive means.

3. A gamma ray radiation detector having reduced response to cosmic rays, comprising a first radiation counter providing no substantial opposition to the passage of gamma ray energy therethrough responsive to produce signals upon the passage therethrough of cosmic radiation particles and in the presence of gamma radiation, a group of secondary radiation counters of the same character as the first disposed about the first counter so that substantially all the individual radiation particles received by the first counter will pass through at least one of the secondary counters with no appreciable absorption therein, and differential combining means connected to the first and secondary counters combining the signals therefrom in opposed polarity relationship operative to deliver an output signal of selected polarity when the first counter produces a signal which is non synchronous with a signal produced by a secondary counter.

4. A gamma ray radiation detector having low response to cosmic rays, comprising a first radiation counter responsive to produce signals upon the passage therethrough of cosmic radiation particles and in the presence of gamma radiation, a group of secondary radiation counters of the same character as the first disposed about the first counter so that substantially all the individual radiation particles received by the first counter will pass through at least one of the secondary counters with no substantial absorption, differential combining means connected to the first and secondary counters combining the signals therefrom in opposite polarity relationship effecting cancellation of signals from the first counter occurring in coincidence with signals from the secondary counters, and rectifier means connected to said last named means eliminating from the combined signals, signals produced by the secondary counters alone.

5. A gamma ray radiation detector having reduced response to cosmic radiation products, comprising a first gas filled discharge tube of cylindrical structure providing no substantial opposition to the passage of gamma ray energy therethrough, a plurality of secondary gas filled discharge tubes similar to the first surrounding the first tube with longitudinal axes thereof parallel, means supplying a polarizing voltage to the secondary tubes in parallel and to the first tube independently, and differential combining means connected to the first and secondary tubes operative to combine the signals therefrom in opposed polarity relationship to deliver an output signal of selected polarity when the first tube produces a signal which is not simultaneous with a signal produced by a secondary tube.

6. A gamma ray radiation detector having reduced response to cosmic radiation products, comprising a first gas filled discharge tube of cylindrical structure, a plurality of secondary gas filled discharge tubes similar to the first tube surrounding the first tube with longitudinal axes thereof parallel, means supplying a polarizing voltage to the secondary tubes in parallel and to the first tube independently, differential combining means connected to the first and secondary tubes combining the signals therefrom in opposite polarity relationship effecting cancellation of signals from the first tube occurring in coincidence with signals from the secondary tubes, and unilateral signal delivery means connected to said last named means eliminating from the combined signals, signals of the polarity produced by the secondary tubes.

7. A gamma ray radiation detector device having reduced response to cosmic radiation products, comprising a first gas filled discharge tube of cylindrical structure, a plurality of secondary gas filled discharge tubes similar to the first surrounding the first tube with longitudinal axes thereof parallel, means supplying a polarizing voltage to the secondary tubes in parallel and to the first tube independently, transformer means connected to the first and secondary tubes combining the signals therefrom in opposed polarity relationship to produce cancellation of signals from the first tube which occur in coincidence with signals from the secondary tube, and rectifier means connected to the transformer output eliminating therefrom output signals produced in response to signals from the secondary tubes alone while delivering output signals in response to signals from the first tube alone.

8. A gamma radiation detector, comprising a first radio active counter means, a second radio active counter means surrounding the first providing no substantial opposition to the passage of gamma ray energy to the first counter, and transformer means connected to the first and second counter means combining in opposition the output signals from said first and second counter means.

GILBERT J. PERLOW.
JOHN D. SHIPMAN, Jr.
CLARENCE A. SCHROEDER.

REFERENCES CITED

The following references are of record in the file of this patent:

UNITED STATES PATENTS

| Number | Name | Date |
| --- | --- | --- |
| 2,285,840 | Scherbatskoy | June 9, 1942 |
| 2,397,071 | Hare | Mar. 19, 1946 |
| 2,445,305 | Hochgesang | July 13, 1948 |